US012706503B2

(12) United States Patent
Mehler

(10) Patent No.: US 12,706,503 B2
(45) Date of Patent: Aug. 11, 2026

(54) COIL ASSEMBLY

(71) Applicant: BorgWarner Inc., Auburn Hills, MI (US)

(72) Inventor: Stefan Mehler, Dreisen (DE)

(73) Assignee: BORGWARNER INC., Auburn Hills, MI (US)

( * ) Notice: Subject to any disclaimer, the term of this patent is extended or adjusted under 35 U.S.C. 154(b) by 211 days.

(21) Appl. No.: 18/206,710

(22) Filed: Jun. 7, 2023

(65) Prior Publication Data

US 2024/0364173 A1 Oct. 31, 2024

(30) Foreign Application Priority Data

Apr. 26, 2023 (DE) ........................ 102023110802.6

(51) Int. Cl.
*H02K 3/50* (2006.01)
*H02K 3/28* (2006.01)
*H02K 5/04* (2006.01)

(52) U.S. Cl.
CPC ................ *H02K 3/50* (2013.01); *H02K 3/28* (2013.01); *H02K 5/04* (2013.01)

(58) Field of Classification Search
CPC ............ H02K 3/50; H02K 5/04; H02K 15/20; H02K 3/52–521
USPC ........................................................ 310/89
See application file for complete search history.

(56) References Cited

U.S. PATENT DOCUMENTS 2,575,115 A * 11/1951 Linke ...................... H02K 3/50 310/260
2,922,902 A * 1/1960 Hargreaves ............. H02K 5/04 310/43
3,002,119 A * 9/1961 Ernst ........................ H02K 3/38 310/260
3,064,152 A * 11/1962 Gueck ...................... H02K 5/04 310/90
3,979,822 A * 9/1976 Halm .................. H02K 5/1732 310/43
3,984,712 A * 10/1976 Hill ......................... H02K 3/50 310/71

(Continued)

FOREIGN PATENT DOCUMENTS

DE 2642291 A1 3/1978
GB 1362141 A 7/1974
WO 2018043364 A1 3/2018

OTHER PUBLICATIONS

English language abstract and machine-assisted English translation for DE 26 42 291 A1 extracted from espacenet.com database on Jun. 7, 2023, 5 pages.

(Continued)

*Primary Examiner* — Alexander Talpalatski
(74) *Attorney, Agent, or Firm* — Howard & Howard Attorneys PLLC

(57) ABSTRACT

A coil assembly for an electric motor having an encapsulation body includes a fixing cage, a winding region, and encapsulation material. The fixing cage, a rear side of which is open, has an inner side and an outer side, between which a circumferential receiving region is defined. The winding region is arranged in an end region of the coil assembly and over which the fixing cage is placed at the end such that the winding region is arranged in the receiving region. The fixing cage and the winding region are embedded in the encapsulation material.

16 Claims, 4 Drawing Sheets

(56) References Cited

U.S. PATENT DOCUMENTS

| | | | | | |
|---|---|---|---|---|---|
| 4,801,831 | A * | 1/1989 | Lewis | H02K 1/185 | 310/91 |
| 5,475,275 | A * | 12/1995 | Dohogne | H02K 5/15 | 310/90 |
| 5,610,461 | A * | 3/1997 | Dohogne | H02K 5/15 | 310/89 |
| 6,300,698 | B1 * | 10/2001 | Fargo | H01R 39/32 | 310/91 |
| 6,366,000 | B1 * | 4/2002 | Higashino | H02K 9/06 | 310/43 |
| 8,492,943 | B2 * | 7/2013 | Fargo | H02K 11/27 | 337/14 |
| 8,584,771 | B2 * | 11/2013 | Vollmer | B24B 23/028 | 173/171 |
| 2002/0047479 | A1 * | 4/2002 | Choi | H02K 3/50 | 310/260 |
| 2009/0160276 | A1 * | 6/2009 | Ley | H02K 5/15 | 310/260 |
| 2010/0001597 | A1 * | 1/2010 | Noll | H02K 5/203 | 310/58 |
| 2014/0248164 | A1 * | 9/2014 | Chang | H02K 5/10 | 417/354 |
| 2022/0166282 | A1 * | 5/2022 | Schmid | H02K 3/50 | |

OTHER PUBLICATIONS

English language abstract and machine-assisted English translation for WO 2018/043364 A1 extracted from espacenet.com database on Jun. 7, 2023, 15 pages.

* cited by examiner

COIL ASSEMBLY

CROSS-REFERENCE TO RELATED APPLICATIONS

This application claims priority pursuant to 35 U.S.C. 119 (a) to German Patent Application No. 102023110802.6 filed Apr. 26, 2023, which application is incorporated herein by reference in its entirety.

BACKGROUND

The invention relates to a coil assembly for an electric motor.

A coil assembly can be used, for example, as a stator coil assembly for an electric motor. Such an electric motor can be provided as an electrical means of assistance for a turbine-driven compressor in a charger assembly of a vehicle. Alternatively, the compressor of the charger assembly is driven in an exclusively electric manner using a stator coil assembly, and a turbine for driving the compressor is not provided.

Conventional coil assemblies comprise winding regions at the end, which are encapsulated, the intention being that the wires of the winding regions should be surrounded by the encapsulation material. In the production of such an encapsulation body, the wires of the winding region to be encapsulated are first brought into a predetermined shape, such that they would be arranged within the subsequent encapsulation body. The wires lie side-by-side and have no further means of retention in the surface region. The wires in the winding region, which have been shaped in this way, also referred to as turns, are encapsulated with a two-component encapsulation compound for better heat transfer, for example. For this purpose, the as yet unencapsulated intermediate product is further completed and prepared in various process steps. The steps of the encapsulation process are carried out with the introduction of heat and include preheating, encapsulation and curing as process steps. Handling of the intermediate product and the introduction of heat lead to individual wires being raised from the preshaped winding region. These wires can no longer be pushed into their original position, and therefore the shape of the coil changes and the raised wires may protrude from the encapsulation body. In order to avoid this effect, cable ties are used to fix the wires in conventional coil assemblies, with eleven or twelve cable ties being required for a winding region, for example. The cable ties are attached manually, tightened, the protrusion is cut off and then the cable tie closure is pressed between the wires and the iron core. The cable ties are encapsulated with the wires. Banding methods using a round cord or flat cord can also be used to fix the winding region in conventional coil assemblies.

Means for fixing the windings are shown in various documents. DE 26 42 291 A1 relates to a production method for internal-rotor electric motors, in which a winding-head arch is provided with an inner cage and outer, hooked-in supporting clamps. A winding head is provided with an outer cage and inner, hooked-in supporting clamps. GB 1362141 shows the fastening of windings of a stator assembly. WO 2018/043364 A1 shows an insulator which is provided on a stator core and on which a winding is arranged.

SUMMARY

It is the object to provide an alternative coil assembly.

The object is achieved by means of a coil assembly for an electric motor having the features of claim 1. It comprises an encapsulation body, which comprises a fixing cage, the rear side of which is open and which has an inner side and an outer side, between which a circumferential receiving region is defined. The encapsulation body comprises a winding region, which is arranged in a coil assembly located at the end and over which the fixing cage is placed at the end, with the result that the winding region is arranged in the receiving region. The fixing body and the winding region are embedded in encapsulation material.

In this coil assembly, the fixing cage holds the winding region in its shape and protects it during handling in production and prevents wires of the winding region from being raised during handling and encapsulation and also by temperature inputs during production. In the finished coil assembly, the wires of the winding region are encapsulated in such a way that they do not project or are not exposed through the surface of the encapsulation body either on the outside or on the inside or at the ends. In this coil assembly, cable ties can be completely or largely dispensed with. At most two cable ties may still be required in a connection region of the encapsulation body. The winding region is completely covered with encapsulation material at the end and on the inside and outside, ensuring that an insulating and heat transfer layer of the wires is not interrupted and a failure risk caused in this way in the case of a coil assembly designed as a stator coil assembly can be ruled out during operation.

The winding region comprises the end-located wire sections or wires of the windings which run in the receiving region of the fixing cage. The winding region advantageously has an annular shape, wherein, in embodiments, the wires or wire sections within the winding region can have some other shape and, for example, can have loops or twisted regions. In one exemplary embodiment, the winding region comprises the end-located, encapsulated wire sections of a concentrated or distributed winding.

The fixing cage has an open rear side for placing it on the winding region. The outer side and the inner side define a circumferential receiving region for the wires of the winding region, which run between the inner side and the outer side. The fixing cage is placed on the winding region before encapsulation. During production, the fixing cage serves to protect and fix the wires of the winding region.

Both the inner side and the outer side are perforated, allowing the encapsulation material to enter the receiving region and embed the winding region and the fixing cage. The fixing cage can be formed by elongate web-shaped structures which are sufficiently stable but also largely open in order not to hinder the encapsulation process.

The encapsulation body forms an end region of the coil assembly which protects the wires of the winding region. The encapsulation body comprises the encapsulation material in which the winding region is embedded with the fixing cage placed upon it. The encapsulation material surrounds and penetrates the fixing cage and the winding region, ensuring, in particular, that the receiving region is encapsulated. In one embodiment, the fixing cage is not completely surrounded by the encapsulation material, but a surface region of the encapsulation body can also comprise exposed regions of the fixing cage which are not covered by the encapsulation material. In some embodiments, wires may protrude from the encapsulation body at most on the rear side, out of the encapsulated winding region. No wires protrude from the encapsulation body on the inside, on the outside and at the ends or form surface regions there. A suitable encapsulation material is selected according to the encapsulated components. A two-component encapsulation compound can be used, for example.

In one embodiment, the receiving region is of annular design. The receiving region is defined by the annular inner side and the annular outer side, which runs around the inner side. The inner side and the outer side act as inner and outer fixing rings. Such an embodiment can be placed on the winding region like a double crown and acts as a wire-fixing protective ring. In one embodiment, the fixing cage has a hollow ring shape which is open at the rear and has, for example, a substantially rectangular cross section.

In one embodiment, the encapsulation body has a cavity surrounded by the inner side of the fixing cage. In a stator coil assembly, the cavity forms a rotor space, in which the rotor is arranged and rotates. The encapsulation body then advantageously has a hollow-cylindrical basic shape.

In one embodiment, the fixing cage is designed in such a way that wires of the winding region are held within the receiving region. The fixing cage prevents the wires from being raised, whether due to handling or encapsulation temperature inputs, during production, thus ensuring that they do not protrude from the encapsulation body on the inside, on the outside or at the ends. During encapsulation, the winding region and the fixing cage are placed in an encapsulation mold, such that the fixing cage spaces the wires apart from an inner wall of the encapsulation mold during encapsulation, and they therefore also do not form a surface region of the encapsulation body.

The coil assembly with a fixing cage reduces the time required for production by approximately 250 seconds to approximately 50 seconds compared to conventional production. A reject rate, which can quite easily be as high as 20% in conventional production, is reduced to 2% to 3%. A conventional encapsulation process can be adapted by providing a fixing cage; additional production tools, in particular for the actual encapsulation process, are not required.

Advantageously, the fixing cage is of one-piece design, and it can therefore be produced in a simpler manner, for example from plastic by injection molding. Before installation, the fixing cage is advantageously elastically deformable, thus enabling it to be clamped onto the winding region before encapsulation. During the insertion of the intermediate product with the fixing cage placed on it into the encapsulation mold, the fixing cage may be elastically deformed if its outer region is supported on the encapsulation mold, thus ensuring that, in the finished encapsulation body, the previously supported regions, as exposed regions of the fixing cage, are then flush with an outer surface of the encapsulation material surrounding the exposed regions.

In one embodiment, the inner side and the outer side of the fixing cage are defined by side webs running from an end-located top region of the fixing cage to the rear side. The webs fix the wires arranged in the receiving region in their position and enable the receiving region to be penetrated with encapsulation material during encapsulation.

In one embodiment, the fixing cage has a circumferential inner top edge web and a circumferential outer top edge web. Intermediate webs run between the top edge webs, which advantageously have a circular shape and are, in particular, arranged concentrically, in order to connect the top edge webs. In one embodiment, side webs run from the top edge webs to the rear side. The elongate rod-shaped webs can have a round, oval or (rect) angular cross section, for example. They can run straight or, in particular in the case of the intermediate webs, in a curved or bent manner. The webs form a lightweight, delicate, but nevertheless stable fixing cage which does not hinder the flow of the encapsulation material during encapsulation. In addition, shaping with pin- and ring-shaped webs produces the desired spacing between the winding wires of the winding region and the encapsulation mold during production.

In one embodiment, the intermediate webs run radially and/or the side webs run at right angles or almost at right angles to the intermediate webs. The side webs can advantageously run axially.

In one embodiment, two encapsulation bodies, in each of which a winding region and a fixing cage are encapsulated, are arranged at opposite ends. The winding regions are arranged in opposite end regions of the coil assembly. The two encapsulation bodies can be of one-piece design with a central encapsulation region connecting them, forming an overall body. Such a coil assembly can be designed as a stator coil assembly, which can form an electric motor together with a rotor. The stator coil assembly can be used, for example, in a charger assembly of a vehicle. The charger assembly can be an exhaust turbocharger or a charger of a fuel cell assembly. In one embodiment, one of the encapsulation bodies faces a turbine, and the other encapsulation body faces a compressor. There are alternative embodiments which are driven in an exclusively electric manner and have no turbine.

BRIEF DESCRIPTION OF THE DRAWINGS

Some exemplary embodiments are explained in greater detail below with reference to the drawing. In the drawing.

In the figures, identical or functionally identical elements are provided with the same reference signs.

DETAILED DESCRIPTION

Figure 1:
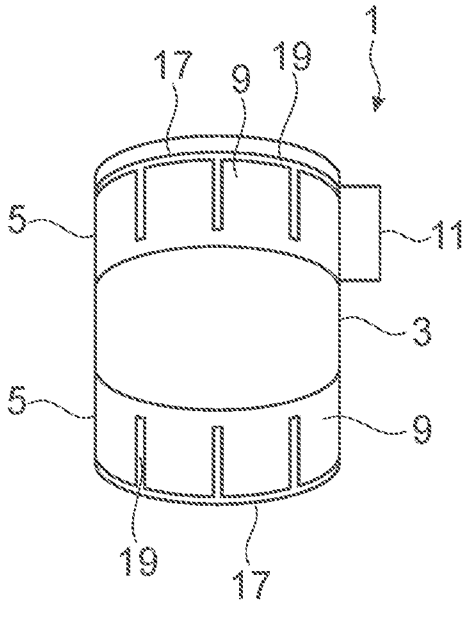
FIG. 1 shows one exemplary embodiment of a coil assembly.

FIG. 1 shows one exemplary embodiment of a coil assembly for an electric motor, which is designed as a stator coil assembly.

The coil assembly 1 comprises a central region 3, which comprises a laminated core, and end-located encapsulation bodies 5 at opposite ends of the central region 3. Winding regions 7 with wires (not visible in FIG. 1) are embedded in an encapsulation material 9 in the encapsulation bodies 5. The coil assembly 1 has a hollow cylindrical basic shape. Outer shells of the encapsulation bodies 5 are flush or have an offset with respect to the exterior of the central region 3. The coil assembly 1 can be contacted via a radially outwardly projecting connection region 11 with contacts 13 (not visible in FIG. 1) of rectangular cross section. The contacts 13 are laterally surrounded by encapsulation material 9. The connection region 11 is an integral component of the encapsulation body 5.

Such a coil assembly 1 is used as a stator of an electric motor in a charger assembly for a vehicle drive. In the interior of the coil assembly 1, a cavity 15 is formed as a receiving region for a rotor. Such an electric motor with a stator and a rotor can electrically assist a turbine-driven compressor. In this case, the rotor is comprised of a shaft, at the opposite ends of which a compressor wheel and a turbine wheel are arranged. One encapsulation body 5 faces the compressor wheel; the other encapsulation body 5 faces the turbine wheel. Alternatively, the compressor is driven in an exclusively electric manner by an electric motor having a coil assembly 1. No turbine is provided.

In the encapsulation bodies 5, a winding region 7 with winding wires and a fixing cage 17, which is placed on the end of the winding region 7, are embedded in the encapsulation material 9. The fixing cage 17 prevents the winding wires of the winding region 7 from being raised during handling and encapsulation, ensuring that they do not protrude from the encapsulation body 5 and are completely embedded in the encapsulation material 9. The encapsulation material 9 surrounds the wires of the winding region 7 and the fixing cage 17 and penetrates them, so that at most regions 19 of the fixing cage 17 which form a surface of the encapsulation body 5 are exposed. The other surface regions of the encapsulation body 5 are formed by encapsulation material 9.

In FIG. 1, the surface of the encapsulation body 5 comprises, by way of example, an exposed region 19 of the fixing cage 7. This region 19 runs circumferentially in a ring around the outer shell of the encapsulation body with elongate webs projecting toward the central region 3. The surface of the encapsulation body 5 is level and its shape is determined by an encapsulation mold during production. The exposed regions 19 of the fixing cage 7 rest against the inner side of the encapsulation mold during casting. In an alternative embodiment, the fixing cage 17 is completely surrounded by the encapsulation material 9.

Figure 2:
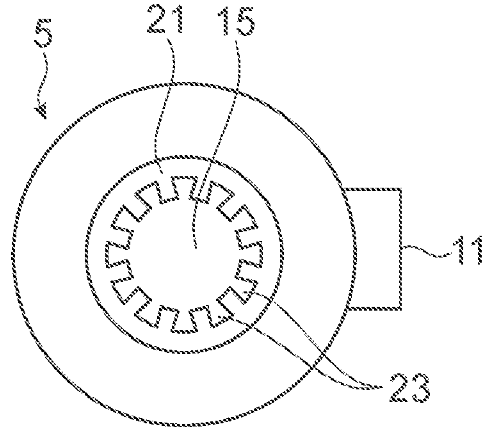
FIG. 2 shows a first plan view of the end of the coil assembly.

FIG. 2 shows a plan view of the end of the coil assembly of FIG. 1. The illustrated end (at the top in FIG. 1) faces the compressor of the charger. The compressor-side encapsulation body 5 has a hollow-cylindrical basic shape, the interior of which has a step 21, into which equidistant longitudinal notches 23 project. The connection region 11 projects radially outward. In this encapsulation body 5, the fixing cage 7 is completely covered at the end by encapsulation material 9.

Figure 3:
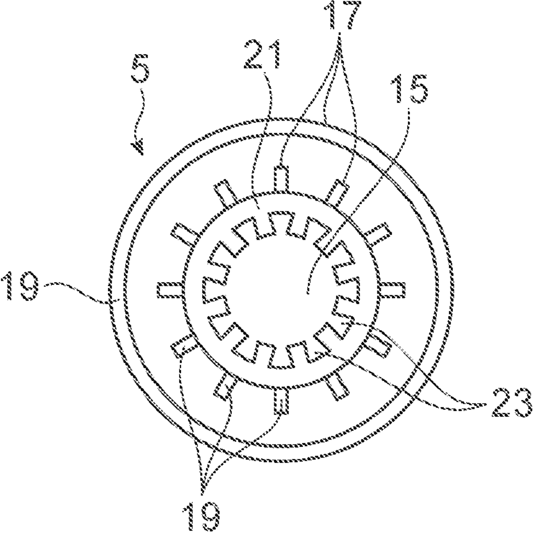
FIG. 3 shows a second plan view of the end of the coil assembly.

FIG. 3 shows a plan view of the end of the coil assembly of FIG. 1. The illustrated end (at the bottom in FIG. 1) faces the turbine. The turbine-side encapsulation body 5 has a hollow-cylindrical basic shape, the interior of which has a step 21, into which equidistant longitudinal notches 23 project. In this encapsulation body 5, exposed regions 19 of the fixing cage 17 form an end surface of the encapsulation body 5. An annular exposed region 19 of the fixing cage 7 forms the outer edge at the end of the encapsulation body 5. Radial webs are regions 19 which are exposed on the upper side and form surface regions of the encapsulation body 5.

The end-located encapsulation bodies 5 can be formed and cast in one piece as a single component, wherein a connecting encapsulation region in the central region 3 runs between the encapsulation bodies 5.

Figure 4:
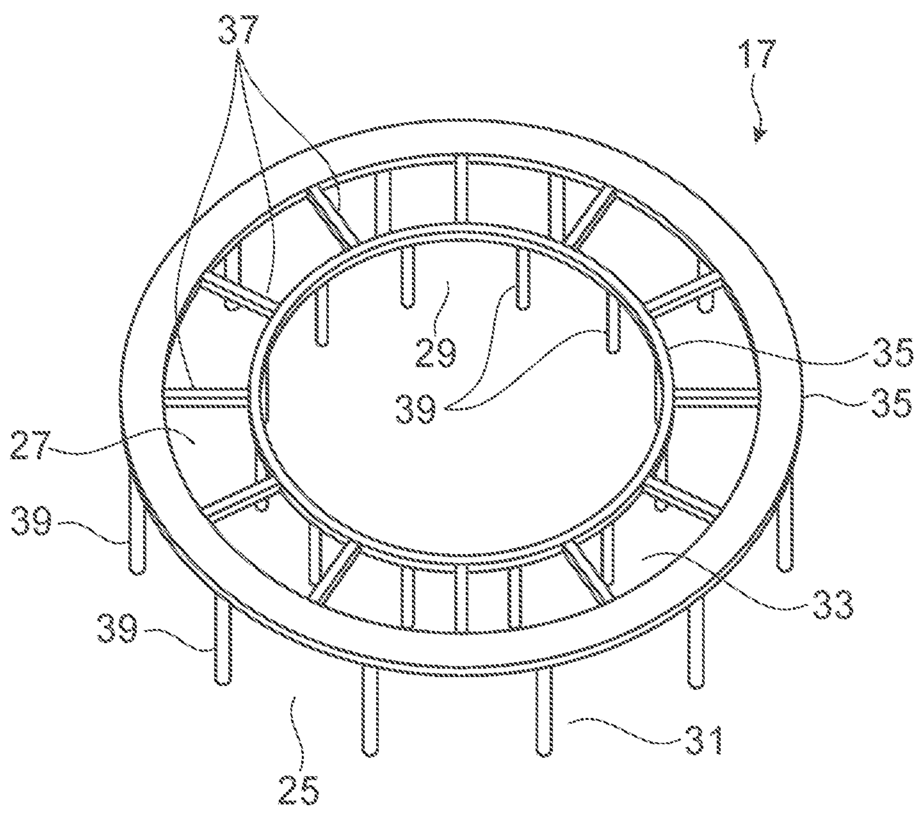
FIG. 4 shows a three dimensional view of a first exemplary embodiment of a fixing cage.

FIG. 4 shows a first exemplary embodiment of a fixing cage 17. The fixing cage 17 has an open rear side 25, an opposite top side 27 as well as an inner side 29 and an outer side 31. A circumferential receiving region 33 for the winding wires of the winding region 7 to be encapsulated is defined between the inner side 29 and the outer side 31. The top side 27, the inner side 29 and the outer side 31 of the fixing cage 17 are perforated and, in this exemplary embodiment, are formed from two concentrically arranged rings as top edge webs 35, which are connected by radial intermediate webs 37, which define the top side 27. Perpendicularly to the radial intermediate webs 37, side webs 39 projecting from the rings to the rear side 25 define the inner side 29 and the outer side 31 and thus the receiving region 33 located therebetween.

The webs 35, 37, 39 can have a round, oval or angular cross section, for example. Other cross sections are likewise possible. For reasons of stability, the outer ring of the top edge web 35 has a flattened, widened cross section. In the encapsulated fixing cage 17, the receiving region 33 surrounds the rotor region as a cavity 15 in the interior of the encapsulation body 5.

The above-described fixing cage 17 with straight intermediate webs 37 is advantageously arranged on the compressor side.

Figure 5:
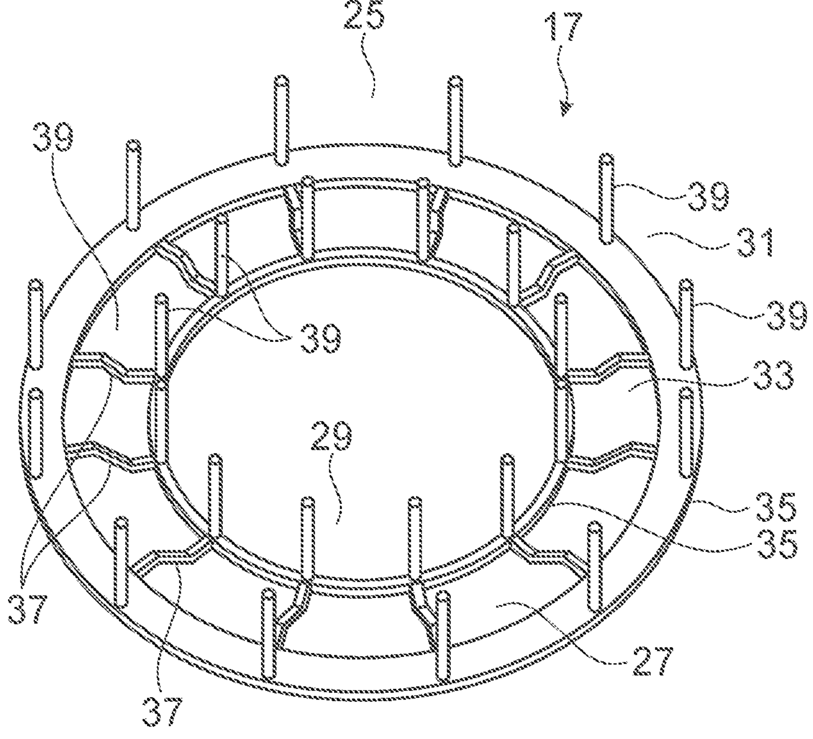
FIG. 5 shows a three-dimensional view of a second exemplary embodiment of a fixing cage.

FIG. 5 shows a second exemplary embodiment of a fixing cage 17. The fixing cage 17 has an open rear side 25, an opposite top side 27 as well as an inner side 29 and an outer side 31. A circumferential receiving region 33 for the winding wires of the winding region 7 to be encapsulated is defined between the inner side 29 and the outer side 31. This exemplary embodiment differs from the above-described embodiment in particular by the shape of the intermediate webs 37 which connect the annular top edge webs 35. The intermediate webs 37 run radially between the rings and have a bent profile in the axial direction, with the result that the inner ring is axially offset with respect to the outer ring. The inner ring projects beyond the outer ring at the end. The above-described fixing cage 17 is advantageously used on the turbine side, wherein both the outer ring and inner sections of the intermediate webs 37 form part of the encapsulation body surface as exposed regions 19, as shown in FIG. 3.

Figure 6:
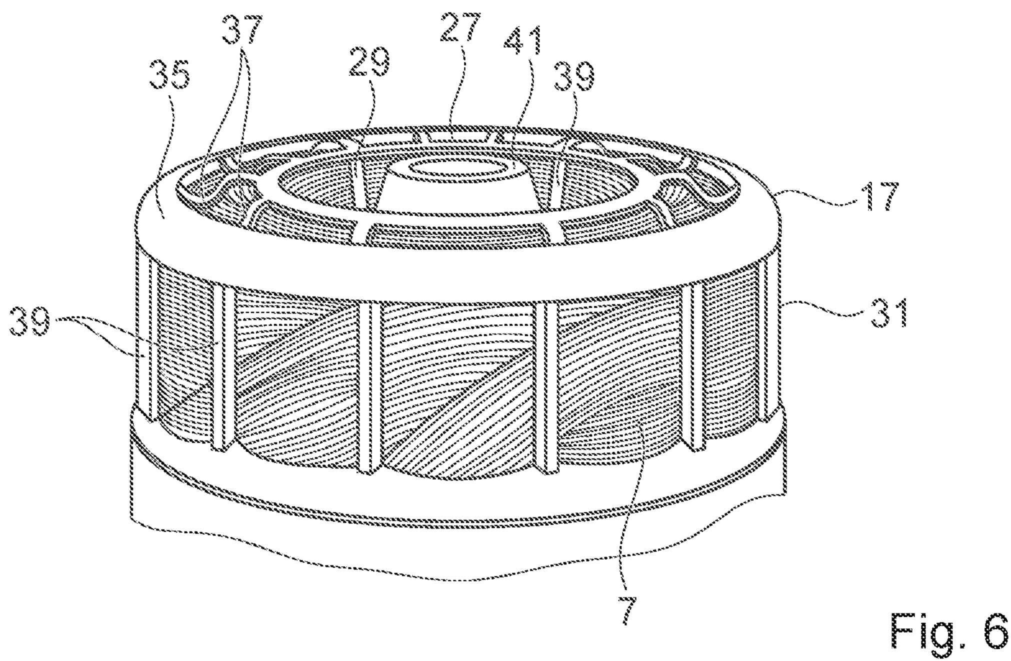
FIG. 6 shows a three-dimensional view of one exemplary embodiment of an intermediate product.

FIG. 6 shows a three-dimensional segment of an intermediate product of the coil assembly 1, the encapsulation body 5 of which has not yet been formed.

The fixing cage 17 has already been placed on the turbine-side winding region 7, and therefore the winding wires of the winding region 7 run in the receiving region 33 of the fixing cage 17. The webs 35, 37, 39 of the fixing cage 17 prevent the winding wires from being raised both toward the inside and the outside and toward the end on the top side 27 of the fixing cage 17 during subsequent handling and encapsulation. After encapsulation, the segment shown forms the turbine-side encapsulation body 5, on which no connection region 11 is provided. A molding tool 41 for the subsequent encapsulation process has already been inserted in the interior of the fixing body.

Figure 7:
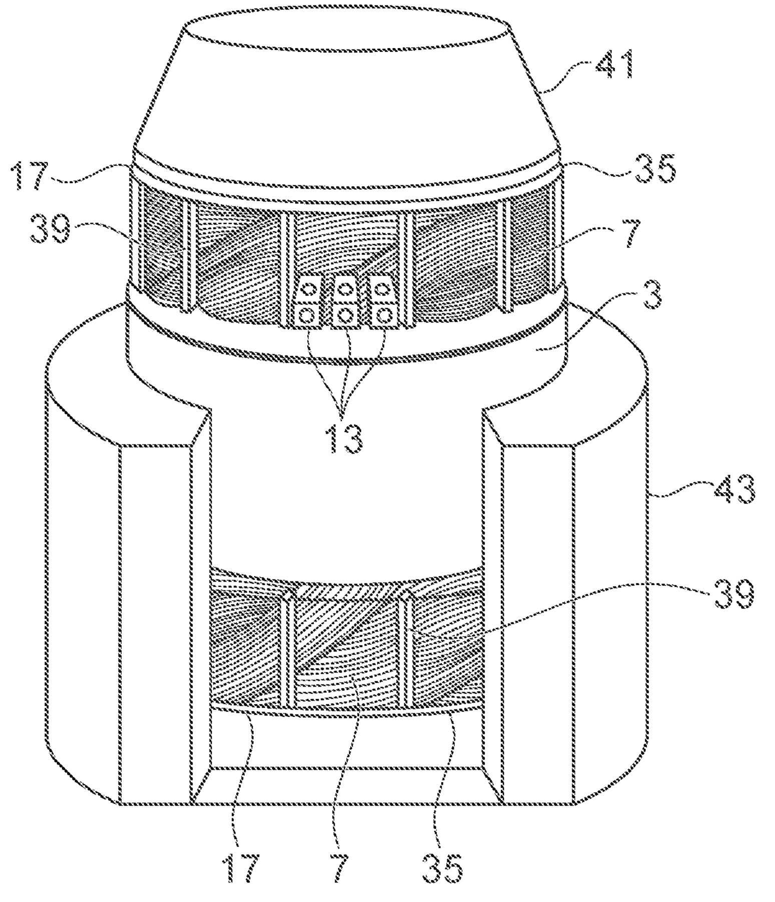
FIG. 7 shows a three-dimensional view of one exemplary embodiment of a casting.

FIG. 7 shows a three-dimensional segment of the intermediate product with a molding tool 41 and an encapsulation mold part 43, into which the intermediate product is inserted, with the result that the compressor-side winding region 7 is at the top. Contacts 13 are provided on the compressor-side winding region 7 and are encapsulated in the subsequent connection region 11.

The production of the coil assembly 1 comprises the placing of the fixing cages 17 on the winding regions 7. A fixing cage 17 is placed on the compressor-side winding region 7, and a further fixing cage 17 is placed on the turbine-side winding region 7. The winding regions 7 extend in the receiving regions 33 of the fixing cages 17. The fixing cages 17 can differ from one another, as described by way of example in conjunction with FIGS. 4 and 5.

During encapsulation, the intermediate product with the central region 3, the winding regions 7 and the fixing cages 17 placed on the ends is positioned in an encapsulation mold. In this exemplary embodiment, the encapsulation mold is in several parts and comprises a shell part with a slot as the encapsulation mold part 43 shown in FIG. 7 in order to facilitate the insertion of the intermediate product. After insertion, the slot is closed by a further encapsulation mold part. A further encapsulation mold part is provided for forming the compressor-side encapsulation body 5 with the connection region 11. The hollow rotor region is formed by a molding tool 41, which is placed on the compressor-side fixing cage 17 and projects into the intermediate product.

After the encapsulation mold has been completed, the casting produced in this way is heated in an oven for drying and preheating. Subsequently, in an encapsulation step, a two-component encapsulation mixture is metered and introduced into the encapsulation mold in order to form the encapsulation bodies 5 and to embed the winding regions 7 and fixing cages 17 in this encapsulation material 9. The casting is then cured in a heating process and cooled, and then the encapsulated stator coil assembly is removed from the encapsulation mold.

Figure 8:
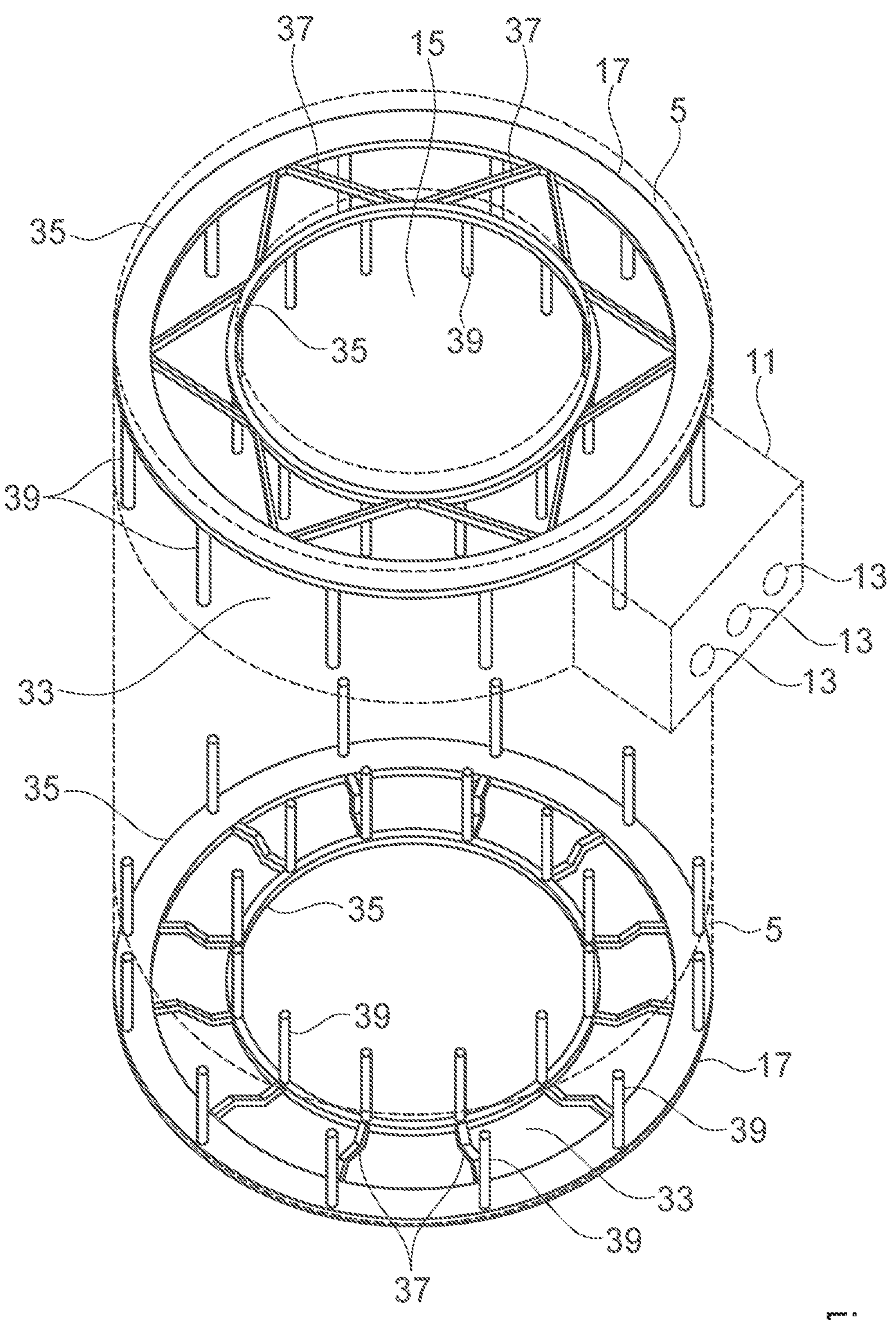
FIG. 8 shows a three-dimensional illustration of the positions of the fixing cages.

FIG. 8 illustrates, in a three-dimensional representation, by way of example, the arrangement of the fixing cages 17 and the outer edges of the encapsulation bodies 5 in which they are embedded. In this exemplary embodiment, the intermediate webs 37 on the top side 27 of the upper fixing cage 17 not only extend radially but also have a tangential component, and therefore a star-shaped structure is formed between the annular top edge webs 35.

This representation illustrates the position and function of the fixing cages 17. The fixing cages 17, the rear sides 25 of which face one another, hold the winding regions 7 with the winding wires in their predetermined shape in the receiving regions 33 and protect them during the subsequent production steps. Wires are prevented from being raised during production-related handling and the temperature inputs during encapsulation since the possibility of movement of the wires is restricted by the webs 35, 37, 39.

The shape of the fixing cage 17 with its webs 35, 37, 39 produces a desired spacing between the winding wires of the winding region 7 and the encapsulation mold, ensuring that the winding region 7 is embedded in the encapsulation material 9 and the wires do not project on or over the surface of the encapsulation body 5. The shape of the fixing cages 17 makes it possible in exemplary embodiments to form a turbine-side sealing surface and prevents compressor-side wire protrusion.

The annular top edge webs 35 with the side webs 39 projecting in the axial direction define an annular inner side 29 and an annular outer side 31 for fixing the winding region 7 in the receiving region 33.

The fixing cage 17 is so elastic that it can be deformed and fitted into the encapsulation mold when the intermediate product is inserted into the encapsulation mold or when the molding tool 41 is inserted. In particular, the side webs 39 are elastic, and therefore they are deformable relative to the rings. This also makes it easier to mount the fixing cage 17 on the winding region 7 and clamps the fixing cage 17 onto the winding region 7. The intermediate webs 37 hold the position of the two rings relative to one another, whether axially offset or in one plane, and make it possible to compensate for different wire winding heights.

The inner ring of the fixing cage 17 defines the position of the assembly relative to the molding tool 41, which engages in the intermediate product. The outer ring is supported against the inner wall of the encapsulation mold. The outer ring prevents individual wires from being raised, particularly in the compressor-side connection region. The curvature of the lower outer ring of the turbine-side fixing cage 17 allows a continuous sealing surface in the encapsulation compound.

Overall, the fixing cage 17 with its webs 35, 37, 39 has the effect that the wires are at a predetermined distance from the encapsulation surface and the wires are prevented from coming to rest against the wall of the encapsulation mold.

The specification of the length of the pins as side webs 39 makes it possible to compensate for different wire winding diameters and promotes insertion into the encapsulation mold. Cable ties are no longer required for the turbine side. As regards the compressor side, in one exemplary embodiment only two cable ties are provided in the connection region, and these fix a large circumferential length.

One exemplary embodiment of the coil assembly can also be used for a charger assembly without a turbine and with a compressor which is driven in an exclusively electric manner. The designation "turbine side" or "facing the turbine" used in the above description then corresponds to "away from the compressor side" or "facing away from the compressor".

The features indicated above and in the claims and those which can be gathered from the figures can be implemented in an advantageous way, both individually and in various combinations. The invention is not restricted to the exemplary embodiments described but can be modified in a variety of ways within the capabilities of a person skilled in the art.

REFERENCE SIGNS

1 coil assembly
3 central region
5 encapsulation body
7 winding region
9 encapsulation material
11 connection region
13 contacts
15 cavity
17 fixing cage
19 exposed region
21 step
23 longitudinal notches
25 rear side
27 top side
29 inner side
31 outer side
33 receiving region
35 top edge web
37 intermediate web
39 side web
41 molding tool
43 encapsulation mold part

What is claimed is:

1. A coil assembly for an electric motor having an encapsulation body, the coil assembly comprising:

a fixing cage, a rear side of which is open and which has an inner side and an outer side, between which a circumferential receiving region is defined, a winding region arranged in an end region of the coil assembly and over which the fixing cage is placed at the end such that the winding region is arranged in the circumferential receiving region of the fixing cage, and an encapsulation body comprised of encapsulation material, in which the fixing cage and the winding region are embedded, wherein the encapsulation body has a top wall and a side wall, wherein the fixing cage has a circumferential inner top edge web and a circumferential outer top edge web, and wherein a perforated top side is defined by intermediate webs which run between the top edge webs and wherein the inner side and the outer side of the fixing cage are each perforated and are each defined by a plurality of side webs, which run from the circumferential inner top edge web and the circumferential outer top edge web to the rear side of the fixing cage, wherein the circumferential outer top edge web is exposed on the side wall of the encapsulation body or at an outer edge of the encapsulation body, and wherein the intermediate webs run radially between the top edge webs and have a bent profile, with an inner top edge axially offset from an outer top edge, the inner top edge projecting beyond the outer top edge at an end, wherein each intermediate web has at least two bends that are not in a same horizontal plane such that the at least two bends are offset from each other.

2. The coil assembly as claimed in claim 1, wherein a region forming a surface region of the encapsulation body is an exposed region of the fixing cage.

3. The coil assembly as claimed in claim 1, wherein the circumferential receiving region is annular.

4. The coil assembly as claimed in claim 1, wherein the encapsulation body has a cavity, around which the inner side of the fixing cage extends.

5. The coil assembly as claimed in claim 1, wherein the encapsulation body is a hollow body with a cylindrical outer shell.

6. The coil assembly as claimed in claim 1, wherein the fixing cage is configured to hold wires of the winding region within the circumferential receiving region of the fixing cage.

7. The coil assembly as claimed in claim 1, wherein the fixing cage is elastically deformed such that the fixing cage clamps on the winding region.

8. The coil assembly as claimed in claim 1, wherein the fixing cage is one piece.

9. The coil assembly as claimed in claim 1, wherein side webs extend from the top edge webs to the rear side of the fixing cage.

10. The coil assembly as claimed in claim 9, wherein the intermediate webs run radially and the side webs run at right angles or almost at right angles relative to the intermediate webs.

11. The coil assembly as claimed in claim 2, wherein the fixing cage is elastically deformed such that the exposed region of the fixing cage is flush with a surface of the encapsulation material surrounding the exposed region.

12. The coil assembly as claimed in claim 1, wherein the fixing cage is a first fixing cage, the winding region is a first winding region, and the encapsulation body is a first encapsulation body, and a second encapsulation body having a second fixing cage and a second winding region is provided, and wherein the first and the second winding regions are arranged in opposite end regions of the coil assembly.

13. The coil assembly as claimed in claim 1, which is a stator coil assembly.

14. The coil assembly as claimed in claim 2, wherein the circumferential receiving region is annular.

15. The coil assembly as claimed in claim 2, wherein the encapsulation body has a cavity, around which the inner side of the fixing cage extends.

16. The coil assembly as claimed in claim 3, wherein the encapsulation body has a cavity, around which the inner side of the fixing cage extends.

* * * * *